No. 879,134. PATENTED FEB. 18, 1908.
W. H. ABTS.
FORK SCRAPER.
APPLICATION FILED SEPT. 16, 1907.

William H. Abts, Inventor.

Witnesses
E. F. Stewart
Herbert D. Lawson

By C. A. Snow & Co.
Attorneys

UNITED STATES PATENT OFFICE.

WILLIAM H. ABTS, OF BELDEN, NEBRASKA.

FORK-SCRAPER.

No. 879,134.

Specification of Letters Patent.

Patented Feb. 18, 1908.

Application filed September 16, 1907. Serial No. 393,218.

*To all whom it may concern:*

Be it known that I, WILLIAM H. ABTS, a citizen of the United States, residing at Belden, in the county of Cedar and State of Nebraska, have invented a new and useful Fork-Scraper, of which the following is a specification.

This invention relates to fork scrapers and is particularly designed for gathering coarse manure, sod, straw, etc.

The object of the invention is to provide a device of this character having tines which are light, strong, and durable in construction and which are mounted in a novel manner so that the movement of collected material along the tines will not be retarded.

Another object is to provide simple means for positively and securely spacing the tines.

With these and other objects in view the invention consists of certain novel features of construction and combinations of parts which will be hereinafter more fully described and pointed out in the claims.

In the accompanying drawings is shown the preferred form of the invention.

Figure 1:
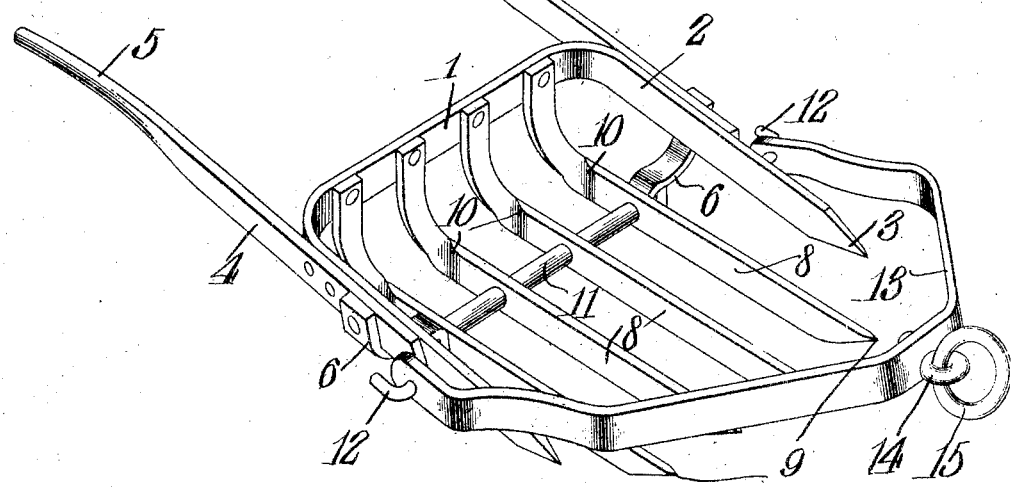
Figure 2:
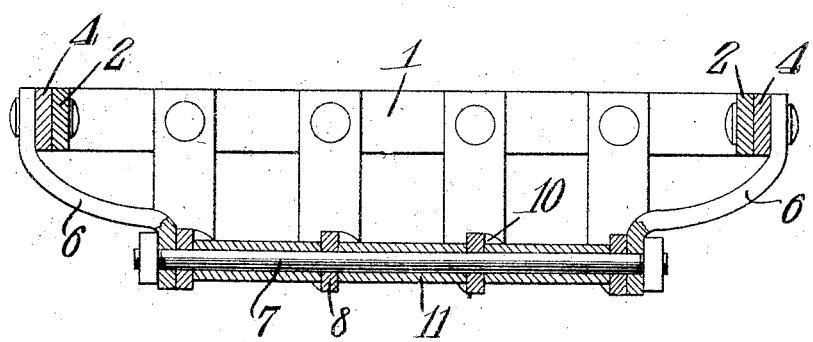

In said drawings: Figure 1 is a perspective view of the device. Fig. 2 is a transverse section.

Referring to the figures by characters of reference, 1 designates a cross strip formed of metal and the end portions of which are extended forward to form guard fingers 2 terminating in points 3. Bars 4 are riveted or otherwise secured to these guard fingers and extend rearwardly therefrom and terminate in handles 5. Secured upon the forward portions of these bars 4 are hangers 6 extending inwardly as well as downwardly from the guard fingers 2 and connected at their lower ends by a cross bolt 7. This bolt extends through the tines 8 of the fork which are formed of metal strips placed on edge and having their forward ends tapered upwardly to points as indicated at 9, while the rear end of each is given a one-quarter twist as indicated at 10 and curved upward and secured to the cross strip 1. It will thus be seen that as only the edges of the tines bear upon the ground the power required to pull the scraper is greatly reduced. Moreover, as the broad faces of the tines are presented to the material thereon at the rear of the scraper the danger of the material being pushed backward between the tines is greatly reduced. In order that the tines may be held properly spaced sleeves 11 are placed upon the bolt 7 and between the tines as clearly indicated in Fig. 2. The forward ends of the bars 4 are provided with hooks 12 to which are pivoted the end portions of a yoke 13. This yoke is designed to extend beyond the points of the tines and fingers and has an eye bolt 14 fastened to the forward portion thereof and provided with a ring 15 whereby a draft animal can be readily hitched to the device.

It will be seen that a device constructed in accordance with the present invention can be conveniently drawn over the ground and the elevated points 3 and 9 will prevent it from digging into the ground. As the spacing and connecting means interposed between the tines is located entirely below the upper edges thereof the movement of the gathered material along the tines will not be hindered.

The device is very substantial and formed of few parts and, by reason of its compact construction can be easily manipulated.

What is claimed is:

1. A fork scraper comprising a cross strip having integral guard fingers, tines interposed between and below the guard fingers and placed on edge, one end of each tine being twisted to present its broad face to the front, said tines being secured to the cross strip and having said broad faces extending downward therefrom.

2. A fork scraper comprising a cross strip having integral guard fingers, tines interposed between and below the guard fingers and placed on edge, one end of each tine being twisted to present its broad face to the front, said tines being secured to the cross strip and having said broad faces extending downward therefrom, and combined spacing and connecting means extending through the tines and disposed below their upper edges.

3. A fork scraper comprising a cross strip having guard fingers at the ends thereof, tines secured to the cross strip and interposed between and below the guard fingers, bars secured to said fingers and extending rearwardly therefrom to constitute handles, a yoke, means upon the front ends of the bars for connecting the yoke thereto.

4. A fork scraper comprising a cross strip, integral guard fingers at the ends thereof, strips secured to and extending downward from the cross strip, said strips being twisted and extended edge downward between and below the guard fingers to constitute tines, hangers depending from the guard fingers, and combined connecting and spacing means secured to the hangers and extending through the tines below the upper edges thereof.

5. A fork scraper comprising a cross strip, integral guard fingers at the ends thereof, strips secured to and extending downward from the cross strip, said strips being twisted and extended edge downward between and below the guard fingers to constitute tines, hangers depending from the guard fingers, combined connecting and spacing means secured to the hangers and extending through the tines below the upper edges thereof, bars secured to the guard fingers and extending rearwardly therefrom to form handles, a yoke, and means upon the front ends of the bars for engaging the yoke.

6. A fork scraper comprising a cross strip having integral guard fingers, flat metal strips secured at one end to the cross strip and extending downward therefrom to present their broad faces to the front, each strip being twisted and extended forward to present a longitudinal edge to the ground, spacing devices interposed between the forwardly projecting portions of the strips, means extending through said devices and strips for holding the strips in fixed relation, and hangers upon the guard fingers and engaging said means.

7. A fork scraper comprising a cross strip having integral guard fingers, flat metal strips secured at one end to the cross strip and extending downward therefrom to present their broad faces to the front, each strip being twisted and extended forward to present a longitudinal edge to the ground, spacing devices interposed between the forwardly projecting portions of strips, means extending through said devices and strips for holding the strips in fixed relation, hangers upon the guard fingers and engaging said means, and bars secured to the fingers and extending rearwardly to constitute handles, each bar having an integral hook at its forward end, and a yoke pivotally connected to the hooks.

In testimony that I claim the foregoing as my own, I have hereto affixed my signature in the presence of two witnesses.

WILLIAM H. ABTS.

Witnesses:
  CHRIS LARSEN,
  CHAS. L. BEATY.